(12) United States Patent
Ting et al.

(10) Patent No.: US 10,644,518 B2
(45) Date of Patent: May 5, 2020

(54) BATTERY POWER SUPPLY SYSTEM AND METHOD

(71) Applicant: FLYTECH TECHNOLOGY CO., LTD, Taipei (TW)

(72) Inventors: Yao-Cheng Ting, Taipei (TW); Shih-Hsuan Lin, Taipei (TW)

(73) Assignee: FLYTECH TECHNOLOGY CO., LTD, Taipei (TW)

( * ) Notice: Subject to any disclaimer, the term of this patent is extended or adjusted under 35 U.S.C. 154(b) by 176 days.

(21) Appl. No.: 15/921,699

(22) Filed: Mar. 15, 2018

(65) Prior Publication Data

US 2019/0245358 A1 Aug. 8, 2019

(30) Foreign Application Priority Data

Feb. 2, 2018 (TW) .............................. 107103857 A

(51) Int. Cl.
*H02J 7/00* (2006.01)
*G06F 1/26* (2006.01)
*H02J 7/34* (2006.01)

(52) U.S. Cl.
CPC ............ *H02J 7/0026* (2013.01); *G06F 1/263* (2013.01); *G06F 1/266* (2013.01); *H02J 7/34* (2013.01)

(58) Field of Classification Search
USPC ........................................................ 320/116
See application file for complete search history.

(56) References Cited

U.S. PATENT DOCUMENTS

| | | | |
|---|---|---|---|
| 2007/0285054 A1* | 12/2007 | Li ........................... | B60L 58/22 320/116 |
| 2012/0175966 A1* | 7/2012 | Nakashima ........... | H02J 7/0019 307/86 |
| 2013/0193768 A1* | 8/2013 | Iwasaki ..................... | H02J 3/32 307/85 |

* cited by examiner

*Primary Examiner* — Brian Ngo
(74) *Attorney, Agent, or Firm* — WPAT, PC

(57) ABSTRACT

A battery power supply system and a battery power supply method for a main system are provided. The battery power supply system includes a power supply processor, an expansion slot module with plural slots, and plural battery units. The plural battery units are docked with the corresponding slots. Moreover, plural control switches are electrically connected between the corresponding slots and the power supply processor. A voltage value of one battery unit is defined as a fiducial voltage value. If the difference between the fiducial voltage value and the voltage value of at least one battery unit of the rest of the battery units is within a predetermined value, the control switch corresponding to the at least one battery unit is turned on. The battery unit with the fiducial voltage value and the at least one battery unit are connected with each other in parallel.

22 Claims, 4 Drawing Sheets

BATTERY POWER SUPPLY SYSTEM AND METHOD

FIELD OF THE INVENTION

The present invention relates to a battery power supply system and a battery power supply method, and more particularly to a battery power supply system with an expansion slot module, wherein plural control switches are connected with plural slots of the expansion slot module and a power supply system and plural battery units are connected with each other through the corresponding control switches.

BACKGROUND OF THE INVENTION

With the advance of modern technology industries, various electronic devices have changed the life styles of modern people. For example, the electronic devices include smart phones, tablet computers, intelligent wearable devices, or the like.

Generally, the commercially available electronic device is equipped with one battery unit. However, the use of the electronic device still has some drawbacks. For example, in case that the electric quantity of the battery is insufficient, it is necessary to replace the battery unit with a new battery unit having higher electric quantity or additionally purchase an external power source (e.g., a mobile power bank) to immediately charge the built-in battery unit of the electronic device. In such way, the electronic device can be continuously operated. That is, the conventional electronic device is not user-friendly.

Moreover, in case that the electronic device is equipped with a new battery unit, some problems occur. For example, there is a voltage difference between the new battery unit and the old battery unit. The battery unit having the higher potential will charge the battery unit having the lower potential. If the voltage difference is very large, a higher current may flow through the two battery units. Under this circumstance, the battery units have the increased risk of suffering from explosion.

In case that the electronic device is equipped with plural new battery units, the electric power conversion efficiency between the battery units is adversely affected. Since the original electronic device is unable to read the information about the newly-added battery units, use of the electronic device is neither convenient nor safe.

For solving the drawbacks of the conventional technologies, there is a need of providing a novel and convenient battery power supply system by integrating the existing electronic device with the battery power supply technology.

SUMMARY OF THE INVENTION

An object of the present invention provides a battery power supply system. The battery power supply system comprises an expansion slot module. The expansion slot module is docked with plural battery units. Moreover, plural control switches are connected with corresponding slots of the expansion slot module and a power supply system. When the control switches are turned on, the battery units are connected with each other in parallel.

In accordance with an aspect of the present invention, there is provided a battery power supply system for a main system. The battery power supply system includes a power supply processor, an expansion slot module and plural battery units. The power supply processor is electrically connected with the main system. The expansion slot module is electrically connected with the power supply processor, and includes plural slots. The plural battery units are docked with the corresponding slots. The slots comprise respective control switches, and the control switches are electrically connected with the power supply unit. The power supply processor defines one of the plural battery units as a fiducial battery unit and defines a voltage value of the fiducial battery unit as a fiducial voltage value. If a difference between the fiducial voltage value and a voltage value of at least one battery unit of the rest of the plural battery units is within a predetermined value, the power supply processor defines the at least one battery unit as at least one selected battery unit. The at least one control switch connected with the at least one selected battery unit is turned on. Consequently, the fiducial battery unit and the at least one selected battery unit are connected with each other in parallel.

In an embodiment, the power supply processor periodically and actively performs a polling process to acquire the voltage values of the plural battery units, or the expansion slot module periodically and actively provides the voltage values of the plural battery units to the power supply processor.

In an embodiment, if the power supply processor judges that the difference between the fiducial voltage value and the voltage value of the at least one battery unit of the rest of the plural battery units is within the predetermined value, the power supply processor generates a control signal and the at least one control switch connected with the at least one battery unit is turned on in response to the control signal.

In an embodiment, when the fiducial battery unit and the at least one selected battery unit are connected with each other in parallel, the fiducial battery unit and the at least one selected battery unit simultaneously perform a charging/discharging operation on the main system.

In an embodiment, the control switches are IC-type circuit switches that are built in the power supply processor, or the control switches are circuit switches that are mounted on a circuit board of the battery power supply system.

In an embodiment, the fiducial battery unit is the battery unit having the highest priority to be electrically connected with the power supply processor among the plural battery units, or the fiducial battery unit with is the battery unit having the highest voltage value or the lowest voltage value among the plural battery units.

In an embodiment, the predetermined value is a voltage value difference between 0.01V and 0.2V.

In an embodiment, the main system is a mobile device, a tablet computer, a notebook computer, a host of a desktop computer or a host of a point-of-sale (POS) device.

In accordance with another aspect of the present invention, there is provided a battery power supply system for a main system. The battery power supply system includes a power supply processor, plural control switches, plural slots and plural battery units. The power supply processor is electrically connected with the main system. The plural control switches are electrically connected with the power supply processor. The plural slots are electrically connected with the power supply processor and the corresponding control switches. Each of the plural slots is connected with the corresponding control switch of the plural control switches. The plural battery units are docked with the corresponding slots. The power supply processor defines one of the plural battery units as a fiducial battery unit and defines a voltage value of the fiducial battery unit as a fiducial voltage value. If a difference between the fiducial voltage value and a voltage value of at least one battery unit of the rest of the plural battery units is within a predetermined value, the power supply processor defines the at least one battery unit as at least one selected battery unit. The at least one control switch connected with the at least one selected battery unit is turned on. Consequently, the fiducial battery unit and the at least one selected battery unit are connected with each other in parallel.

In an embodiment, the battery power supply system further includes an expansion slot module. The plural slots and the corresponding control switches are electrically connected with each other and included in the expansion slot module, or the plural slots comprise the corresponding control switches and are included in the expansion slot module.

In an embodiment, the power supply processor periodically and actively performs a polling process to acquire the voltage values of the plural battery units, or the expansion slot module periodically and actively provides the voltage values of the plural battery units to the power supply processor.

In an embodiment, if the power supply processor judges that the difference between the fiducial voltage value and the voltage value of the at least one battery unit of the rest of the plural battery units is within the predetermined value, the power supply processor generates a control signal and the at least one control switch connected with the at least one battery unit is turned on in response to the control signal.

In an embodiment, when the fiducial battery unit and the at least one selected battery unit are connected with each other in parallel, the fiducial battery unit and the at least one selected battery unit simultaneously perform a charging/discharging operation on the main system.

In an embodiment, the control switches are IC-type circuit switches that are built in the power supply processor, or the control switches are circuit switches that are mounted on a circuit board of the battery power supply system.

In an embodiment, the fiducial battery unit is the battery unit having the highest priority to be electrically connected with the power supply processor among the plural battery units, or the fiducial battery unit with is the battery unit having the highest voltage value or the lowest voltage value among the plural battery units.

In an embodiment, the predetermined value is a voltage value difference between 0.01V and 0.2V.

In accordance with a further aspect of the present invention, there is provided a battery power supply method for use in a main system through a battery power supply system. The battery power supply system includes a power supply processor, an expansion slot module and plural battery units. The expansion slot module is electrically connected with the power supply processor and includes plural slots. The plural battery units are docked with the corresponding slots. Moreover, plural control switches are electrically connected between the corresponding slots and the power supply processor. The battery power supply method includes the following steps. Firstly, one of the plural battery units is defined as a fiducial battery unit, and a voltage value of the fiducial battery unit is defined as a fiducial voltage value. If a difference between the fiducial voltage value and a voltage value of at least one battery unit of the rest of the plural battery units is within a predetermined value, the at least one battery unit is defined as at least one selected battery unit. The at least one control switch that is connected with the at least one selected battery unit is turned on. The fiducial battery unit and the at least one selected battery unit to be connected with each other in parallel.

In an embodiment, the power supply processor periodically and actively performs a polling process to acquire the voltage values of the plural battery units, or the expansion slot module periodically and actively provides the voltage values of the plural battery units to the power supply processor.

In an embodiment, if the power supply processor judges that the difference between the fiducial voltage value and the voltage value of the at least one battery unit of the rest of the plural battery units is within the predetermined value, the power supply processor generates a control signal and the at least one control switch connected with the at least one battery unit is turned on in response to the control signal.

In an embodiment, when the fiducial battery unit and the at least one selected battery unit are connected with each other in parallel, the fiducial battery unit and the at least one selected battery unit simultaneously perform a charging/discharging operation on the main system.

In an embodiment, while the charging/discharging operation is performed, the control switches corresponding to the fiducial battery unit and the at least one selected battery unit are turned on or turned off simultaneously.

In an embodiment, if one of the plural battery units is abnormal, the control switch corresponding to the abnormal battery unit is turned off actively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
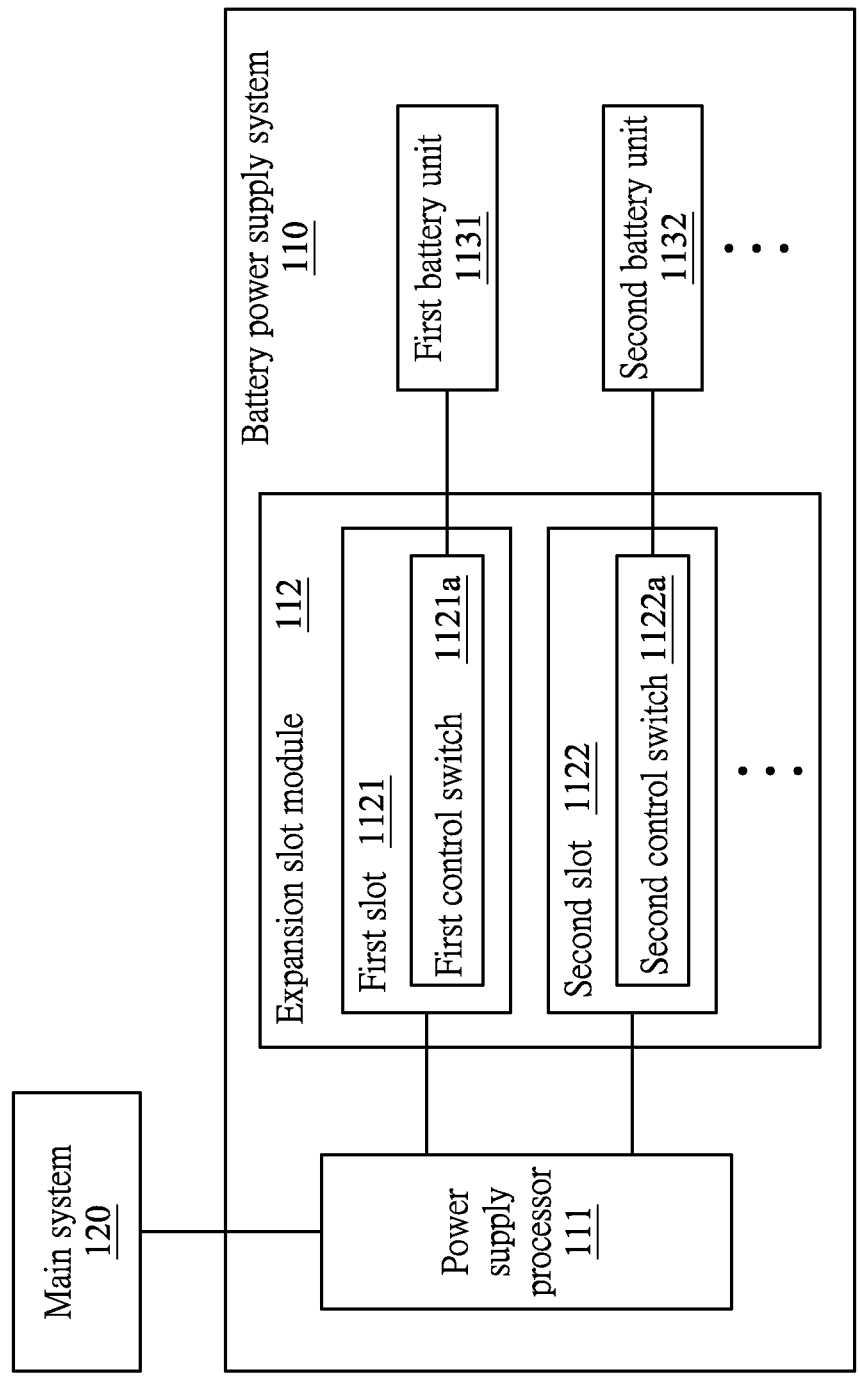
FIG. 1 is a schematic functional block diagram illustrating the architecture of a battery power supply system according to a first embodiment of the present invention.
Figure 4:
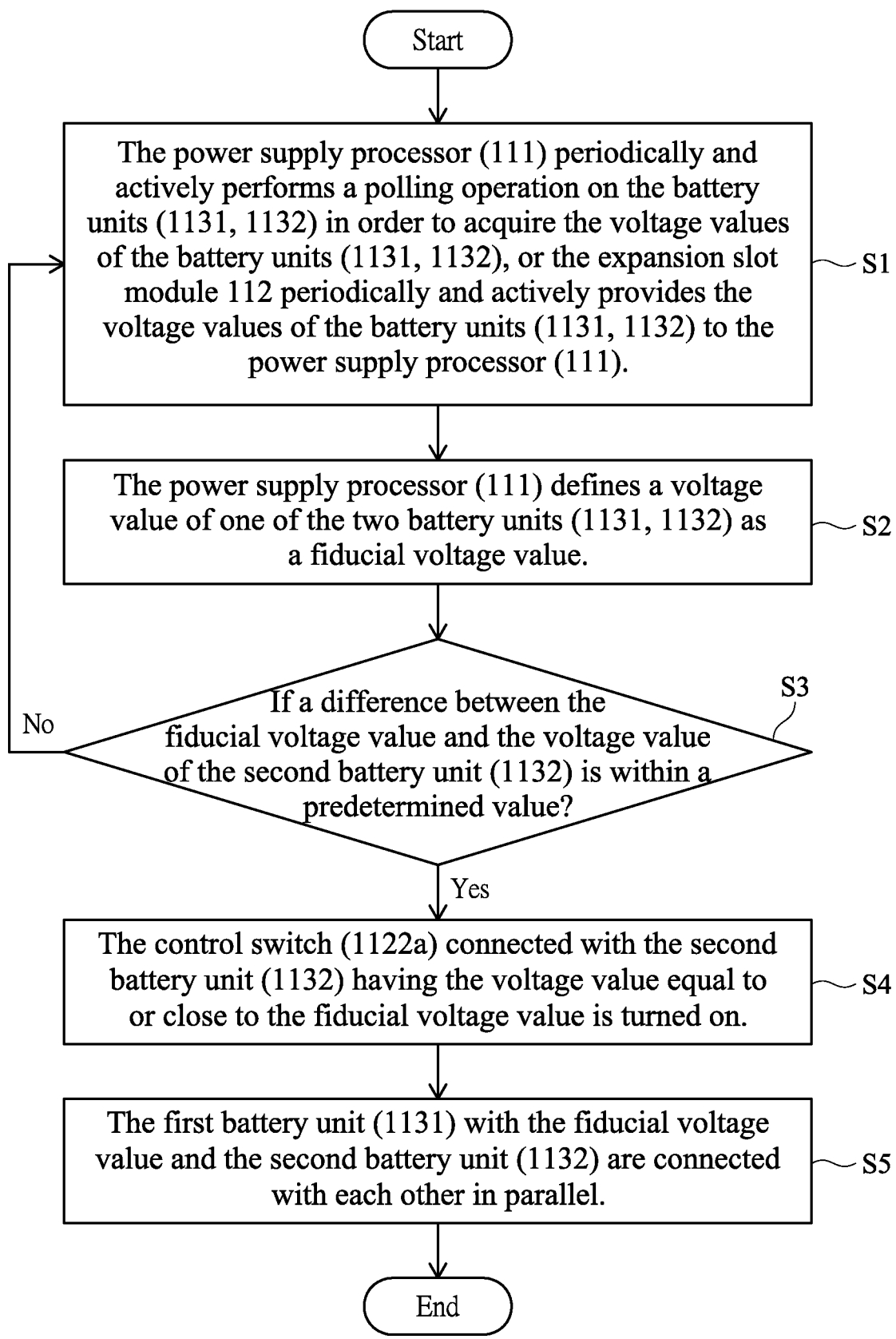
FIG. 4 is a flowchart illustrating a battery power supply method according to an embodiment of the present invention.

Please refer to FIGS. 1 and 4. FIG. 1 is a schematic functional block diagram illustrating the architecture of a battery power supply system according to a first embodiment of the present invention. FIG. 4 is a flowchart illustrating a battery power supply method according to an embodiment of the present invention. The implementation concepts of the present invention will be described with reference to the drawings.

As shown in FIG. 1, the battery power supply system 110 comprises a power supply processor 111, an expansion slot module 112 with plural slots 1121 and 1122, and plural battery units 1131 and 1132. Each slot of the expansion slot module 112 has a corresponding control switch. In this embodiment, the expansion slot module 112 comprises two slots 1121 and 1122. The first slot 1121 has a first control switch 1121*a*. The second slot 1122 has a second control switch 1122*a*. The power supply processor 111 is electrically connected with a main system 120 and the expansion slot module 112. A first battery unit 1131 is docked with the first slot 1121. A second battery unit 1132 is docked with the second slot 1122. Moreover, the first battery unit 1131 and the second battery unit 1132 are electrically conducted through the first control switch 1121*a* and the second control switch 1122*a*, respectively. The main system 120 is a mobile device, a tablet computer, a notebook computer, a host of a desktop computer, a host of a point-of-sale (POS) device, or any other appropriate electronic product or device The flowchart of the operating method of the battery power supply system will be described as follows. Please refer to FIG. 4. After the two slots 1121 and 1122 are respectively docked with the two battery units 1131 and 1132, the battery power supply system 110 performs a step S1. In the step S1, the power supply processor 111 periodically and actively performs a polling operation on the battery units 1131 and 1132 in order to acquire the voltage values of the battery units 1131 and 1132. In an embodiment, the power supply processor 111 periodically the polling operation or actively performs the polling operation in order to acquire the voltage values of the battery units 1131 and 1132. Alternatively, the expansion slot module 112 periodically and actively provides the voltage values of the battery units 1131 and 1132 to the power supply processor 111. For example, when the expansion slot module 112 is connected with the two battery units 1131 and 1132, the voltage values of the battery units 1131 and 1132 are provided to the power supply processor 111, or the voltage values of the currently-connected battery units are periodically reported to the power supply processor 111. Consequently, the power supply processor 111 can performs the subsequent processes. In other words, the voltage values of the battery units connected with the power supply processor are acquired by the power supply processor after the step S1. As long as the functions of the present invention are achieved, the structures are not restricted.

Then, the battery power supply system 110 performs a step S2. In the step S2, the power supply processor 111 defines a voltage value of one of the two battery units 1131 and 1132 as a fiducial voltage value. In an embodiment, the battery unit with the fiducial voltage value is the battery unit having the higher priority to be electrically connected with the power supply processor 111 among the two battery units 1131 and 1132. Alternatively, the battery unit with the fiducial voltage value is the battery unit having the higher voltage value or the lower voltage value among the two battery units 1131 and 1132. For example, the first battery unit 1131 has the first priority to be electrically connected with the power supply processor 111. The voltage value (e.g., 3.7V or 4V) of the first battery unit 1131 is defined as the fiducial voltage value. In addition, the first battery unit 1131 provides electric power to the power supply processor 111.

Then, the battery power supply system 110 performs a step S3. In the step S3, the power supply processor 111 judges whether a difference between the fiducial voltage value and a voltage value of at least one battery unit of the rest of the plural battery units is within a predetermined value. For example, the predetermined value is any voltage value difference between 0.01V and 0.2V. In this example, the power supply processor 111 judges whether the difference between the fiducial voltage value of the first battery unit 1131 and the voltage value of the second battery unit 1132 is within the predetermined value. For example, the predetermined value is 0.05V, 0.1V or 0.2V. If the difference between the two battery units 1131 and 1132 is within the predetermined value, the power supply processor 111 generates a control signal. In response to the control signal, the power supply processor 111 performs a step S4. If the difference between the two battery units 1131 and 1132 is not within the predetermined value, the step S1 is repeatedly done.

If the judging condition of the step S3 is satisfied, the power supply processor 111 recognizes that the voltage value of at least one battery unit of the rest of the plural battery units is equal to or close to the fiducial voltage value. Meanwhile, the control signal is generated. In response to the control signal, the step S4 is performed. In the step S4, the at least one control switch connected with the at least one battery unit having the voltage value equal to or close to fiducial voltage value is turned on. For example, the fiducial voltage value of the first battery unit 1131 is 3.7V, and the predetermined value is 0.1V. In case that voltage value of the second battery unit 1132 is in the range between 3.6V and 3.8V, it means that the difference between the two battery units 1131 and 1132 is within the predetermined value. Meanwhile, the second control switch 1122*a* is turned on by the power supply processor 111. Consequently, the second battery unit 1132 is electrically conducted.

Then, the battery power supply system 110 performs a step S5. In the step S5, the battery unit with the fiducial voltage value and the at least one battery unit are connected with each other in parallel. That is, after the second control switch 1122*a* is turned on by the power supply processor 111 and the second battery unit 1132 is electrically conducted, the two battery units 1131 and 1132 are electrically connected with each other in parallel. In case that the expansion slot module 112 is connected with plural battery units and the differences between the fiducial voltage value and the voltage values of selected battery units are within the predetermined value, the control switches corresponding to the specified battery units are successively turned on. Consequently, the battery unit with the fiducial voltage value and the specified battery units are connected with each other in parallel.

While the first battery unit 1131 with the fiducial voltage value continuously performs a discharging operation on the main system 120, the rest of the battery units connected with the expansion slot module 112 are successively conducted by the power supply processor 111. For example, the second battery unit 1132 is electrically conducted.

Moreover, when the rest of the battery units connected with the expansion slot module 112 (e.g., the second battery unit 1132) and the battery unit with the fiducial voltage value (e.g., first battery unit 1131) are connected with each other in parallel, all of the battery units (e.g., the battery units 1131 and 1132) simultaneously perform a charging/discharging operation on the main system 120 through the power supply processor 111. That is, the power supply processor 111 controls the battery units 1131 and 1132 to simultaneously perform the charging/discharging operation. That is, the control switches corresponding to the battery unit with the fiducial voltage value (e.g., the first battery unit 1131) and the rest of the battery units (e.g., the second battery unit 1132) are turned on or turned off simultaneously. The principles of controlling the battery units to simultaneously perform the charging/discharging operation by the power supply processor are well known to those skilled in the art, and are not redundantly described herein.

From the above descriptions, the present invention provides a battery power supply system. If a difference between the fiducial voltage value and a voltage value of at least one battery unit of the rest of the plural battery units is within the predetermined value, the control switch connected with the at least one battery unit is turned on. Since the battery unit with the fiducial voltage value (also referred as a fiducial battery unit) and the at least one battery unit (also referred as a selected batter unit) are connected with each other in parallel, the battery unit with the fiducial voltage value and the at least one battery unit are protected. Since the voltage difference between the fiducial battery unit and the at least one selected battery unit is not too large, the explosion caused from the generation of the large current is effectively avoided. Moreover, since the voltage difference value is within the predetermined value, the electric power conversion efficiency between the battery units is not adversely affected.

In accordance with a feature of the battery power supply system, one control switch is electrically connected between the corresponding slot and the power supply processor. When the control switches are turned on, the battery unit with the fiducial voltage value and the at least one battery unit of the rest of the plural battery units are connected with each other in parallel. Moreover, the examples of the control switches are not restricted by the first embodiment. For example, in another embodiment, the control switches are circuit switches that are mounted on a circuit board of the battery power supply system. Alternatively, the control switches are IC-type circuit switches that are built in the power supply processor. Some other embodiments of the present invention will be described as follows.

Figure 2:
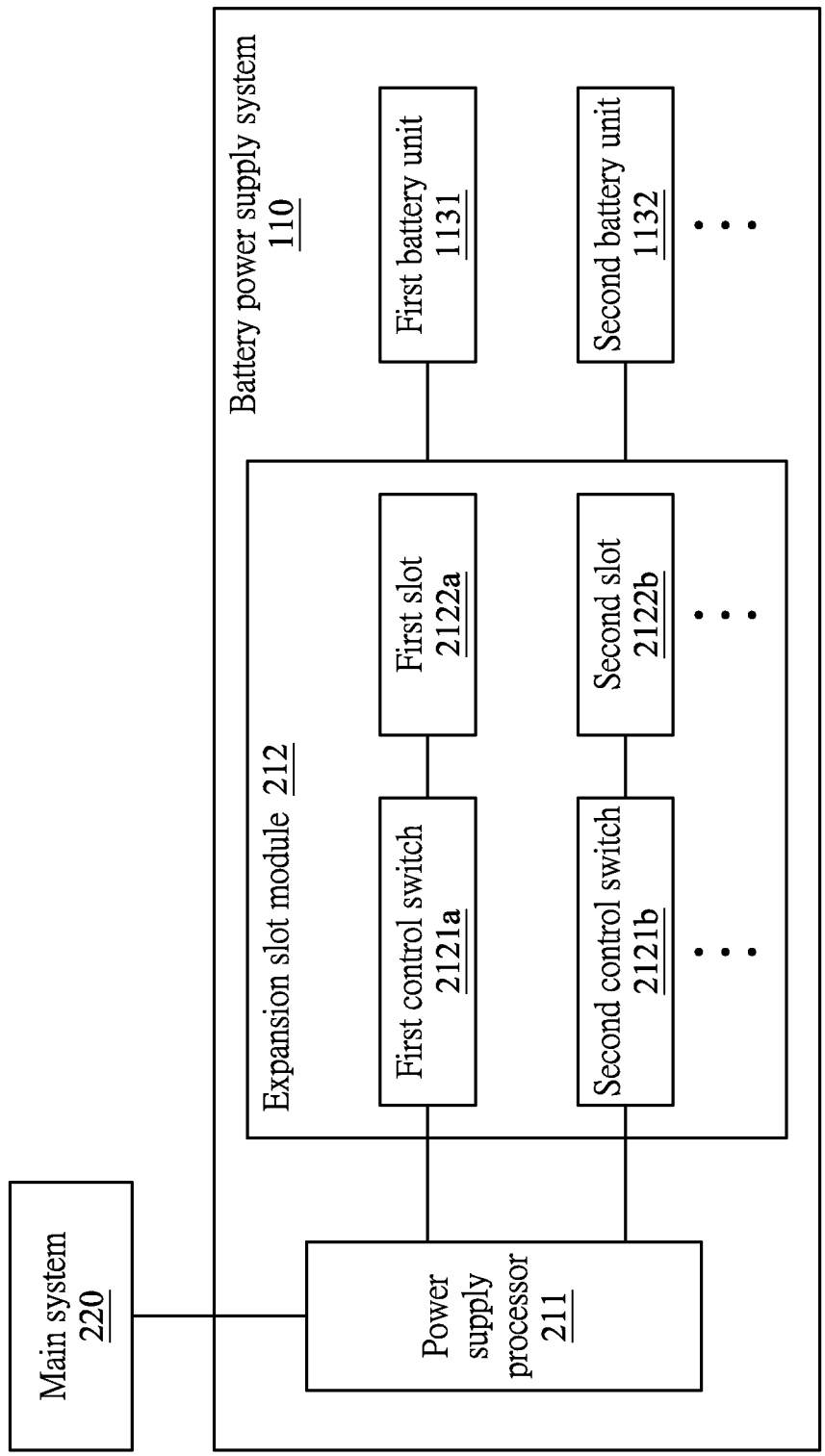
FIG. 2 is a schematic functional block diagram illustrating the architecture of a battery power supply system according to a second embodiment of the present invention.

FIG. 2 is a schematic functional block diagram illustrating the architecture of a battery power supply system according to a second embodiment of the present invention. As shown in FIG. 2, the battery power supply system 210 comprises a power supply processor 211, an expansion slot module 212, and plural battery units 2131 and 2132. The power supply processor 211 is electrically connected with a main system 220 and the expansion slot module 212. The expansion slot module 212 is connected with the plural battery units 2131 and 2132.

In comparison with the above embodiment, the control switches are circuit switches. In this embodiment, the expansion slot module 212 comprises plural control switches 2121a, 2121b and plural slots 2122a, 2122b. Take the first control switch 2121a and the second control switch 2121b for example. The first control switch 2121a is electrically connected with the first slot 2122a. The second control switch 2121b is connected with the second slot 2122b. In response to the control signal from the power supply processor 211, the control switches 2121a and 2121b are turned on or turned off. Consequently, the first battery unit 2131 and the second battery unit 2132 are connected with in parallel or not connected with each other.

Figure 3:
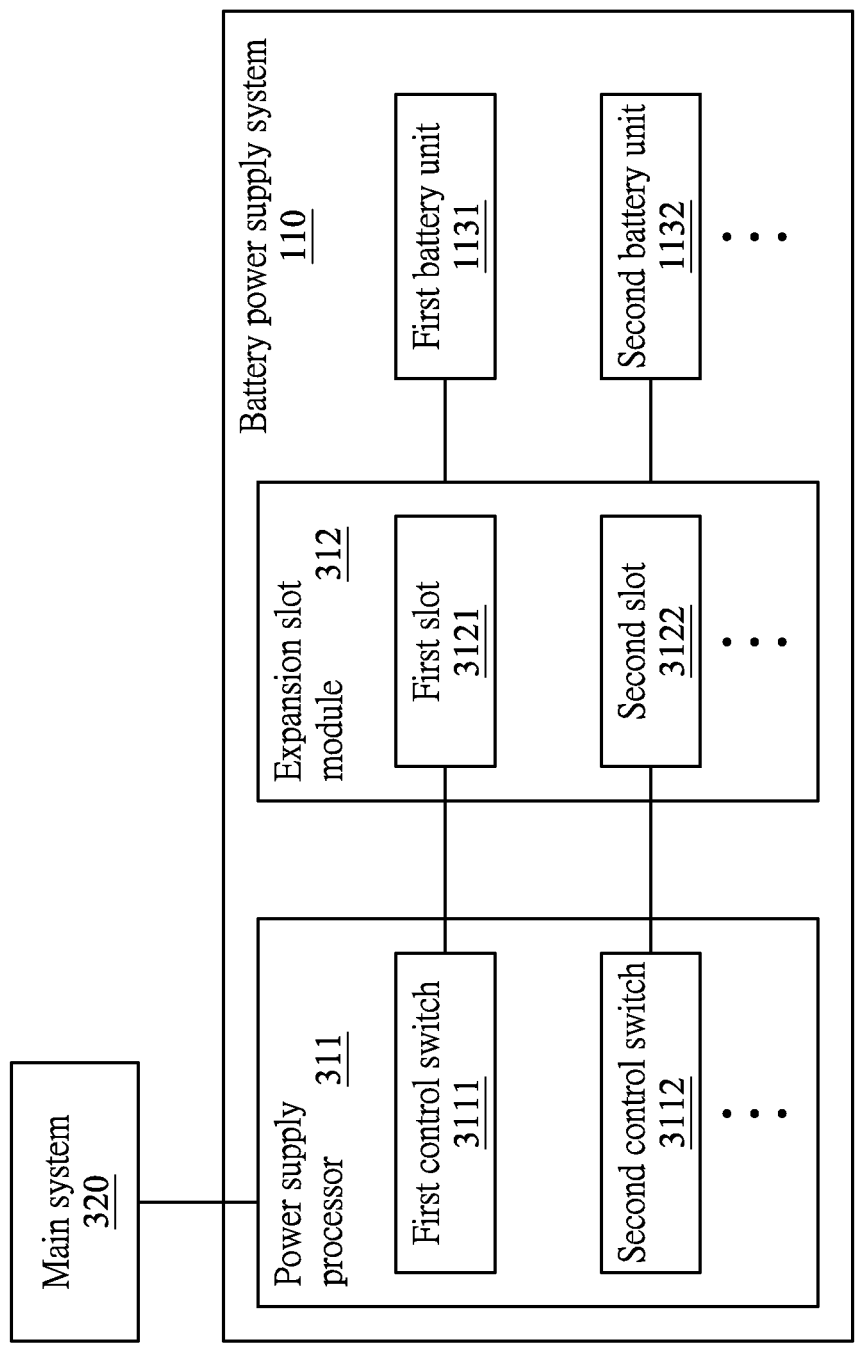
FIG. 3 is a schematic functional block diagram illustrating the architecture of a battery power supply system according to a third embodiment of the present invention.

FIG. 3 is a schematic functional block diagram illustrating the architecture of a battery power supply system according to a third embodiment of the present invention. As shown in FIG. 3, the battery power supply system 310 comprises a power supply processor 311, an expansion slot module 312, and plural battery units 3131 and 3132. The power supply processor 311 is electrically connected with a main system 320 and the expansion slot module 312. The expansion slot module 312 is connected with the plural battery units 3131 and 3132.

In comparison with the above embodiment, the control switches are IC-type circuit switches. Moreover, the power supply processor 311 comprises a first control switch 3111 and a second control switch 3112. The expansion slot module 312 comprises a first slot 3121 and a second slot 3122. The first control switch 3111 is electrically connected with the first slot 3121. The second control switch 3112 is connected with the second slot 3122. The first control switch 3111 and the second control switch 3112 are selectively turned on or turned off. Consequently, the first battery unit 3131 and the second battery unit 3132 are connected with in parallel or not connected with each other.

Moreover, the battery power supply system is further equipped with a protection mechanism. If one of the plural battery units is abnormal, the control switch corresponding to the abnormal battery unit is turned off and thus the electric connection between the control switch and the abnormal battery unit is interrupted. Consequently, the battery power supply system and the abnormal battery unit are protected. Moreover, the control switch is turned off through the expansion slot module or the power supply processor. Alternatively, the control switch is actively turned off to interrupt the corresponding battery unit.

In the first embodiment, the slots of the expansion slot module comprise the corresponding control switches. In the second embodiment, the slots are electrically connected with the corresponding control switches. In another embodiment, the control switches are integrated into a single IC-type circuit switch of the power supply processor. Alternatively, the control switches are plural IC-type circuit switches of the power supply processor. The plural IC-type circuit switches are electrically connected with the corresponding slots.

It is noted that numerous modifications and alterations may be made while retaining the teachings of the invention. The structures and specifications of the above components may be varied according to the practical requirements. As long as the functions of the present invention are achieved, the structures are not restricted.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A battery power supply system for a main system, the battery power supply system comprising:
    a power supply processor electrically connected with the main system;
    an expansion slot module electrically connected with the power supply processor, and comprising plural slots; and
    plural battery units docked with the corresponding slots,
    wherein the slots comprise respective control switches, and the control switches are electrically connected with the power supply unit, wherein the power supply processor defines one of the plural battery units as a fiducial battery unit and defines a voltage value of the fiducial battery unit as a fiducial voltage value, wherein if a difference between the fiducial voltage value and a voltage value of at least one battery unit of the rest of the plural battery units is within a predetermined value, the power supply processor defines the at least one battery unit as at least one selected battery unit, wherein the at least one control switch connected with the at least one selected battery unit is turned on, so that the fiducial battery unit and the at least one selected battery unit are connected with each other in parallel.

2. The battery power supply system according to claim 1, wherein the power supply processor periodically and actively performs a polling process to acquire the voltage values of the plural battery units, or the expansion slot module periodically and actively provides the voltage values of the plural battery units to the power supply processor.

3. The battery power supply system according to claim 1, wherein if the power supply processor judges that the difference between the fiducial voltage value and the voltage value of the at least one battery unit of the rest of the plural battery units is within the predetermined value, the power supply processor generates a control signal and the at least one control switch connected with the at least one battery unit is turned on in response to the control signal.

4. The battery power supply system according to claim 3, wherein when the fiducial battery unit and the at least one selected battery unit are connected with each other in parallel, the fiducial battery unit and the at least one selected battery unit simultaneously perform a charging/discharging operation on the main system.

5. The battery power supply system according to claim 1, wherein the control switches are IC-type circuit switches that are built in the power supply processor, or the control switches are circuit switches that are mounted on a circuit board of the battery power supply system.

6. The battery power supply system according to claim 1, wherein the fiducial battery unit is the battery unit having the highest priority to be electrically connected with the power supply processor among the plural battery units, or the fiducial battery unit with is the battery unit having the highest voltage value or the lowest voltage value among the plural battery units.

7. The battery power supply system according to claim 1, wherein the predetermined value is a voltage value difference between 0.01V and 0.2V.

8. The battery power supply system according to claim 1, wherein the main system is a mobile device, a tablet computer, a notebook computer, a host of a desktop computer or a host of a point-of-sale (POS) device.

9. A battery power supply system for a main system, the battery power supply system comprising:
a power supply processor electrically connected with the main system;
plural control switches electrically connected with the power supply processor;
plural slots electrically connected with the power supply processor and the corresponding control switches, wherein each of the plural slots is connected with the corresponding control switch of the plural control switches; and
plural battery units docked with the corresponding slots, wherein the power supply processor defines one of the plural battery units as a fiducial battery unit and defines a voltage value of the fiducial battery unit as a fiducial voltage value, wherein if a difference between the fiducial voltage value and a voltage value of at least one battery unit of the rest of the plural battery units is within a predetermined value, the power supply processor defines the at least one battery unit as at least one selected battery unit, wherein the at least one control switch connected with the at least one selected battery unit is turned on, so that the fiducial battery unit and the at least one selected battery unit are connected with each other in parallel.

10. The battery power supply system according to claim 9, further comprising an expansion slot module, wherein the plural slots and the corresponding control switches are electrically connected with each other and included in the expansion slot module, or the plural slots comprise the corresponding control switches and are included in the expansion slot module.

11. The battery power supply system according to claim 9, wherein the power supply processor periodically and actively performs a polling process to acquire the voltage values of the plural battery units, or the expansion slot module periodically and actively provides the voltage values of the plural battery units to the power supply processor.

12. The battery power supply system according to claim 9, wherein if the power supply processor judges that the difference between the fiducial voltage value and the voltage value of the at least one battery unit of the rest of the plural battery units is within the predetermined value, the power supply processor generates a control signal and the at least one control switch connected with the at least one battery unit is turned on in response to the control signal.

13. The battery power supply system according to claim 12, wherein when the fiducial battery unit and the at least one selected battery unit are connected with each other in parallel, the fiducial battery unit and the at least one selected battery unit simultaneously perform a charging/discharging operation on the main system.

14. The battery power supply system according to claim 9, wherein the control switches are IC-type circuit switches that are built in the power supply processor, or the control switches are circuit switches that are mounted on a circuit board of the battery power supply system.

15. The battery power supply system according to claim 9, wherein the fiducial battery unit is the battery unit having the highest priority to be electrically connected with the power supply processor among the plural battery units, or the fiducial battery unit with is the battery unit having the highest voltage value or the lowest voltage value among the plural battery units.

16. The battery power supply system according to claim 9, wherein the predetermined value is a voltage value difference between 0.01V and 0.2V.

17. A battery power supply method for use in a main system through a battery power supply system, the battery power supply system comprising a power supply processor, an expansion slot module and plural battery units, the expansion slot module being electrically connected with the power supply processor and comprising plural slots, the plural battery units being docked with the corresponding slots, plural control switches being electrically connected between the corresponding slots and the power supply processor, the battery power supply method comprising steps of:
defining one of the plural battery units as a fiducial battery unit and defining a voltage value of the fiducial battery unit as a fiducial voltage value;
if a difference between the fiducial voltage value and a voltage value of at least one battery unit of the rest of the plural battery units is within a predetermined value, defining the at least one battery unit as at least one selected battery unit;
turning on the at least one control switch that is connected with the at least one selected battery unit; and
allowing the fiducial battery unit and the at least one selected battery unit to be connected with each other in parallel.

18. The battery power supply method according to claim 17, wherein the power supply processor periodically and actively performs a polling process to acquire the voltage values of the plural battery units, or the expansion slot module periodically and actively provides the voltage values of the plural battery units to the power supply processor.

19. The battery power supply method according to claim 17, wherein if the power supply processor judges that the difference between the fiducial voltage value and the voltage value of the at least one battery unit of the rest of the plural battery units is within the predetermined value, the power supply processor generates a control signal and the at least one control switch connected with the at least one battery unit is turned on in response to the control signal.

20. The battery power supply method according to claim 19, wherein when the fiducial battery unit and the at least one selected battery unit are connected with each other in parallel, the fiducial battery unit and the at least one selected battery unit simultaneously perform a charging/discharging operation on the main system.

21. The battery power supply method according to claim 20, wherein while the charging/discharging operation is performed, the control switches corresponding to the fiducial battery unit and the at least one selected battery unit are turned on or turned off simultaneously.

22. The battery power supply method according to claim 17, wherein if one of the plural battery units is abnormal, the control switch corresponding to the abnormal battery unit is turned off actively.

* * * * *